J. F. KELLER.
MACHINE FOR ENGRAVING OR SINKING DIES.
APPLICATION FILED MAY 2, 1917.
1,316,796.
Patented Sept. 23, 1919.
4 SHEETS—SHEET 1.
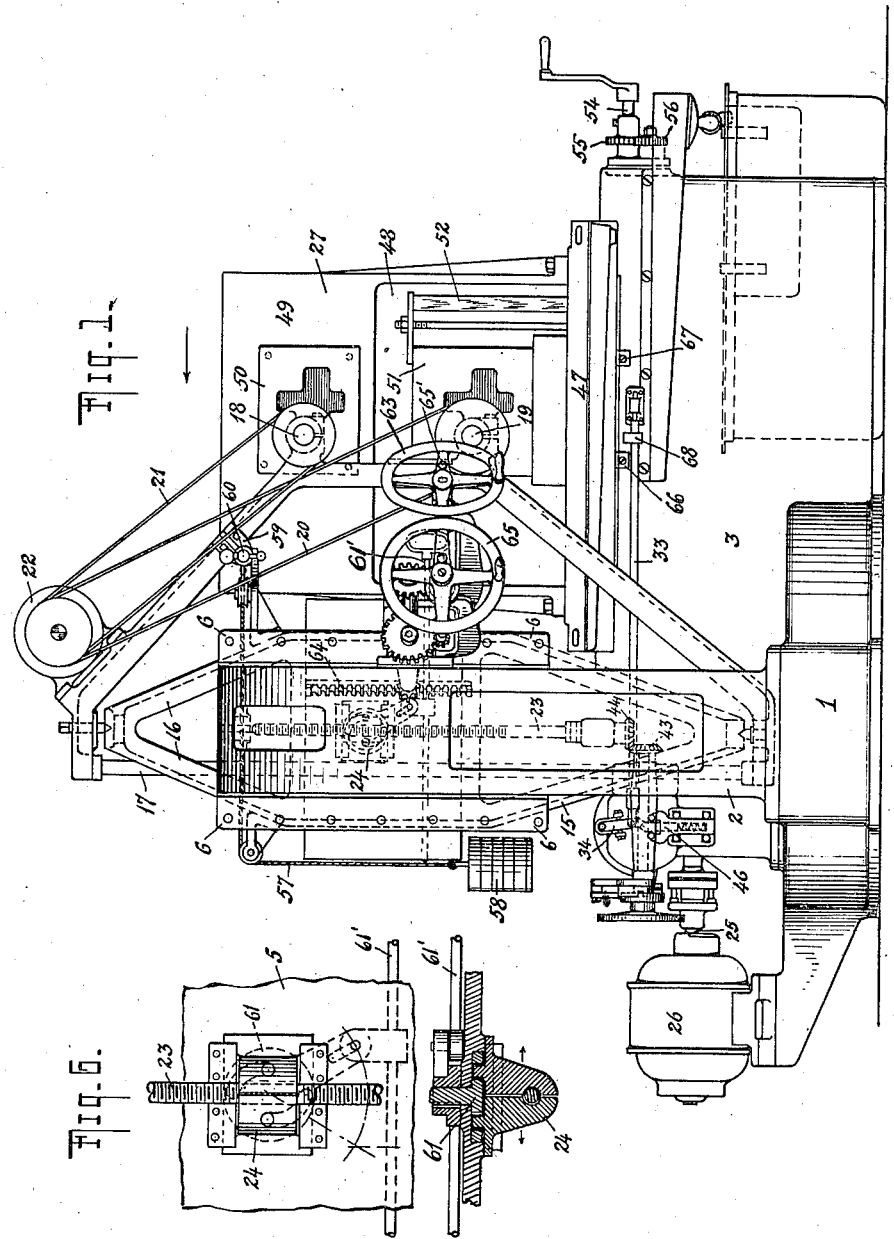
WITNESSES
INVENTOR
JOSEPH F. KELLER
BY
ATTORNEYS J. F. KELLER.
MACHINE FOR ENGRAVING OR SINKING DIES.
APPLICATION FILED MAY 2, 1917.
1,316,796.
Patented Sept. 23, 1919.
4 SHEETS—SHEET 2.
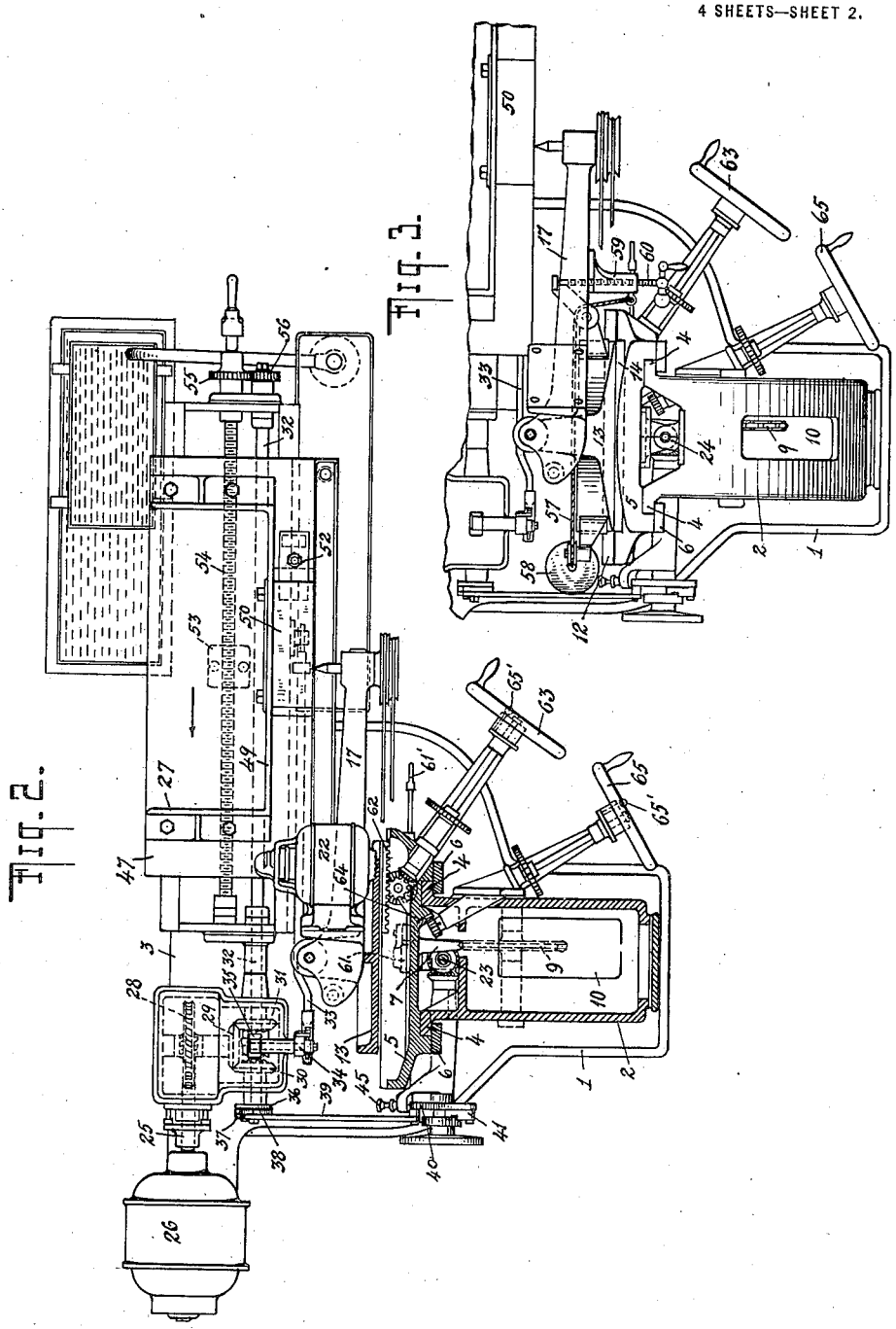
WITNESSES:
INVENTOR
JOSEPH F. KELLER
BY
ATTORNEYS

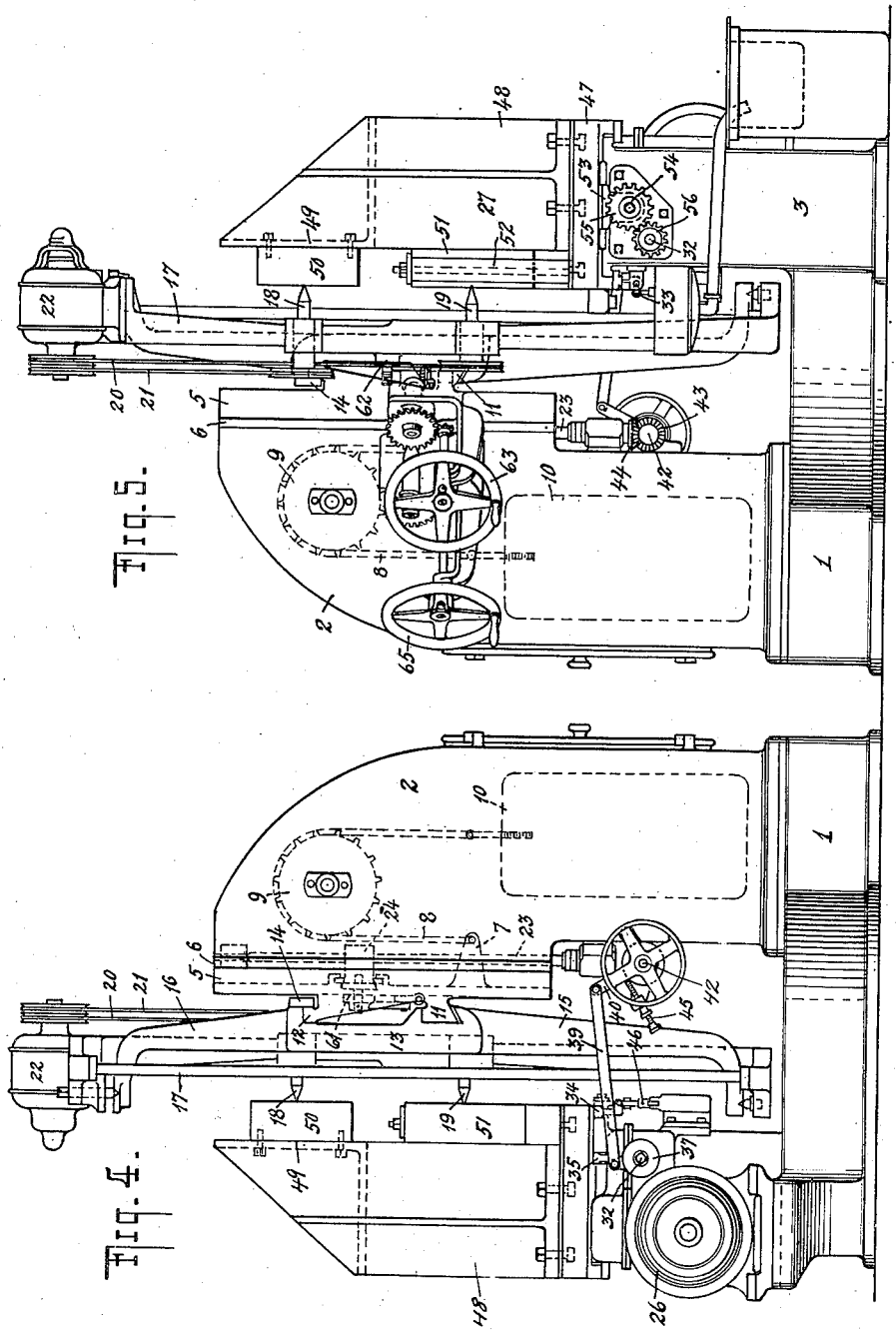

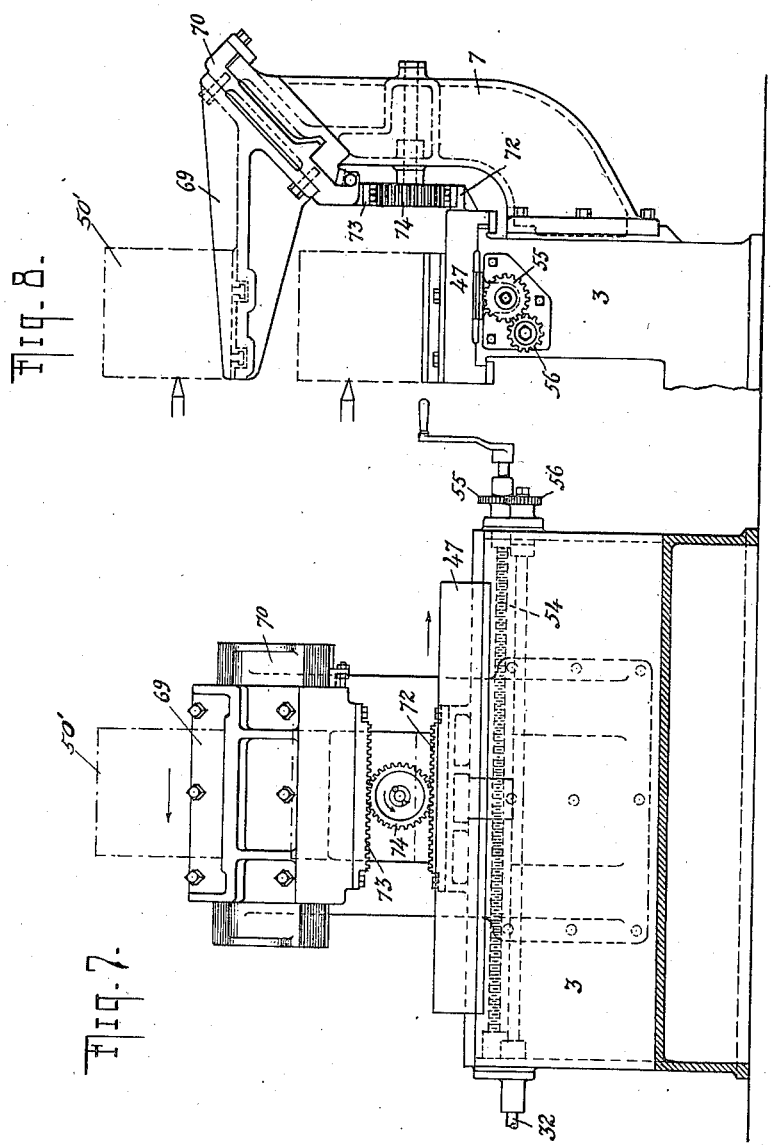

UNITED STATES PATENT OFFICE.

JOSEPH F. KELLER, OF NEW YORK, N. Y.

MACHINE FOR ENGRAVING OR SINKING DIES.

1,316,796. Specification of Letters Patent. Patented Sept. 23, 1919.

Application filed May 2, 1917. Serial No. 165,872.

*To all whom it may concern:*

Be it known that I, JOSEPH F. KELLER, a citizen of the United States, and resident of New York, New York county, State of New York, have invented certain new and useful Improvements in Machines for Engraving or Sinking Dies, of which the following is a specification.

My invention relates to machines for engraving or sinking dies, or for reproducing in relief or intaglio, and more especially to such machines as are to be employed for reproducing a die, from a templet, model or pattern, to the same scale of dimensions.

More particularly my invention relates to certain improvements in a machine, of the class described, patented to William A. Warman and myself jointly, under date of May 3, 1910, Number 956,769.

In the patented machine referred to the work or die blank to be operated on is attached to a plate or frame which is vertically movable, either manually or automatically, and is counterbalanced adjustably to correspond with the combined weight of work and plate. The frame carrying the rotating cutter has horizontal movement only, also either manual or automatic. When the machine is operating automatically the plate or work is moved, upwardly say, under the cutter (the pattern being similarly moved under the tracer) to an extent sufficient to bring the cutter to the lower contour line of the work; the movement of the plate and work is then reversed, the cutter and tracer being simultaneously fed horizontally across the work by a definite small amount, and the work carried downwardly until the cutter reaches the upper contour line of the work when the movement of the work is again reversed and the cutter frame again fed horizontally, and so on until the entire desired area of work has been gone over.

The work or die blank will often be very heavy, as much as 1000 lbs. or more, for example. At each reversal of the work, therefore, this mass, plus that of the frame which carries it, plus the mass of the counterbalancing weight, must have its motion arrested and again quickly resumed in the opposite direction. Owing to the inertia of this large mass a substantial amount of energy is required to accomplish this. It is one of the objects of my present invention to so improve the machine referred to, with respect to the relative movement of work and cutter, as to greatly lessen this required amount of energy.

When the movement of work and cutter is effected manually, as is often desirable in "hogging out," as it is called, *i. e.*, in quickly but roughly cutting out the work to approximately its final form, leaving the exact shaping of the work to the much slower automatic action of the machine operating with a much finer cutting tool, this inertia effect of the large masses referred to manifests itself in a different way, viz., in a diminished sensitiveness. The operator, who is constantly moving the work up or down, now rapidly and now slowly, is unable to "feel" whether or not the tracer is in proper contact with the pattern so that the cutter is doing its work thoroughly and properly. He may thus leave a given portion of the work before the cutter has finished its work or may remain after the cutter has finished. The operator finds the same difficulty in manual operation when he attempts to go over certain fine details of the work to the perfect cutting of which the machine, when operating automatically at a speed which has been determined for the average requirements of the work, is not adapted. Here it is very important that the operator should instantly and constantly "feel" the slightest change in the contact and behavior of both tracer and cutter with respect to pattern and work respectively. It is also an object of the present invention to avoid the just described difficulties and to so arrange the parts that, both when "hogging out" and when cutting fine details, the operator may at all times have this fine sense of touch or "feel" and know exactly what the cutter is doing and with what fidelity the tracer is following the pattern.

I attain the above desirable objects by, first, arranging the work plate and work to reciprocate horizontally instead of vertically, thus eliminating the counterbalancing mass, while arranging the cutter and tracer frame to feed vertically instead of horizontally. This frame, being relatively quite light, requires a correspondingly light counterbalance so that the total inertia effect is small. The energy required to stop and reverse the work at the end of a stroke is, of course, much less than is required when the motion of the work is vertical. And, secondly, I arrange the cutter and tracer frame so that, when moved manually only, it still has a short range of movement horizontally. In "hogging out" and in fine detail work, therefore, the cutter may be moved by hand over the entire area of the work, this operation being performed by first going over a given vertical strip, then moving the work horizontally for a short distance so as to take in the adjacent vertical strip, and so on until the entire area has been gone over.

In the machine of the prior patent, above referred to, the work is necessarily an exact replica of the pattern in every respect. It is often desirable, however, in machines of this type to so arrange that the work shall be reversed in one direction, as from right to left for example, with respect to the pattern while remaining in all other respects exactly like the pattern. One object of my present invention is to provide an attachment for the machine by means of which the work may be given this reverse quality when desired.

Other objects of the invention will appear as the specification proceeds.

My invention will be better understood by referring to the accompanying drawings in which Figure 1 represents a front elevation of the assembled machine; Fig. 2 represents a plan view, part section, of Fig. 1; Fig. 3 shows, in plan, that portion of the machine shown in Fig. 2 in section; Fig. 4 is an elevation looking from the left of Fig. 1; Fig. 5 is an elevation looking from the right of Fig. 1; Fig. 6 is an enlarged detail showing, in elevation and transverse section, the device for releasing the vertically movable cutter and tracer frame carriage from its feed screw; Fig. 7 is a front elevation showing the rear pedestal of the machine of the previous figures with the usual work and pattern support removed and a special support substituted therefor enabling the work produced to be reversed from right to left with respect to the pattern; and Fig. 8 is an end view taken from the right of Fig. 7.

In the drawings a base 1 supports a front pedestal 2 arranged to carry the tracer and cutter frame and a rear pedestal 3 arranged to carry the pattern and work. Preferably, but not necessarily, these pedestals are cast integral with the base. The front pedestal is hollow and the edges of its inner face have the form of laterally projected flanges 4 which are machined so as to coöperate with correspondingly machined faces of a vertically movable tracer and cutter frame carriage 5. Plates 6 bolted to said carriage complete the slide-ways coöperating with flanges 4. A lug 7 projects inwardly from carriage 5 and has attached to it one end of a chain 8 which passes over a sprocket 9 mounted within the pedestal; the other end of the chain carries a weight 10 of magnitude sufficient to counterbalance the carriage with its attached cutter and tracer frame to be described.

The carriage 5 is provided with a transverse machined rib 11 on its inner side and also has its upper portion machined so as to constitute a second rib 12. With these two ribs coöperate suitably machined slideways formed in the rear of a tracer and cutter frame bracket 13, the lower slideway being dovetailed and the upper slideway being completed by a strip 14 bolted to the bracket 13 thus retaining the bracket upon the carriage.

The bracket 13 has a pair of oppositely projecting vertical arms 15 and 16 the extreme ends of which are turned horizontally inward and pivotally support the swinging tracer and cutter frame 17 near one of its ends; the other free end of frame 17 carries the tracer 18 and the cutter 19. Both cutter and tracer are disposed perpendicularly to the plane of frame 17 and at the same distance from its pivotal axis.

Both cutter and tracer are mounted rotatably, although the tracer need not necessarily be, and driven by belts 20 and 21 from a motor 22 attached to the tracer and cutter frame 17 and swinging with it.

A vertically disposed feed screw 23, mounted in suitable bearings attached to and within the pedestal 2, engages with the two halves of a split nut 24, when the machine is to be operated automatically, and is intermittently rotated in one direction or the other, as the case may be, through a predetermined angle so as to correspondingly raise or lower the carriage 5.

This motion of the feed screw is derived from shaft 25 of motor 26, suitably bolted to base 1, which also constitutes the power source for the horizontally reciprocable work and pattern support 27, as will be later described.

Shaft 25 is driven continuously in the same direction and is provided with a worm which drives a worm gear 28 fixed on a short shaft which terminates in a bevel gear 29. Gear 29 is itself in mesh with opposite gears 30 and 31, either one of which, but not the other, is always clutched fast to a longitudinally disposed work feed shaft 32, thereby continuously rotating said shaft in one direction or the other according to the particular gear which is operative.

Which of the two gears, 30 or 31, shall be clutched to shaft 32 is determined by the position of clutch rod 33 one end of which is attached to a pivoted arm 34, to which is attached a block 35 slidably keyed to shaft 32 and having its opposite axial faces provided with ratchet teeth arranged to engage similarly formed teeth on the inner sides of gears 30, 31. The gears 30, 31 being themselves freely rotatable upon shaft 32 it follows that when clutch rod 33 is moved to the left (Figs. 1 and 2) gear 30 will be locked fast to shaft 32 and when the clutch rod is moved to the right gear 31 will be similarly locked; shaft 32 will, hence, be oppositely driven in these two cases.

A fixed disk 36 and a loose disk 37 are mounted upon shaft 32 at its end adjacent gear 30. These disks are separated by a felt disk 38 or the equivalent and held together with moderate pressure. Disk 37 has a radially projecting lug to which is pivoted one end of a link 39 whose other end is pivoted to an arm 40 which is attached to a member 41 loosely mounted upon shaft 42 and provided with ratchet means whereby, when the arm 40 is moved in one direction, shaft 42 is rotated, but when moved in the other direction shaft 42 is unaffected. Shaft 42 carries a bevel gear 43 which meshes with and drives a similar gear 44 on feed screw 23. A stop screw 45 limits the counter-clockwise (as seen from Fig. 4) rotation of arm 40.

Owing to the much shorter length of the lever arm at which disk 37 actuates link 39 as compared with that of arm 40 through which link 39 acts upon shaft 42, complete rotation of shaft 32 will result before arm 40 has crossed the line joining shafts 32 and 42. In operation, therefore, if shaft 32 (as seen in Fig. 4) revolves clockwise, arm 40 will merely move clockwise through a certain angle and then return against stop 45 and remain there as long as shaft 32 continues its clockwise motion And when shaft 32 reverses and rotates counter-clockwise it is clear that exactly the same thing happens and that arm 40 again advances through the same angle as before and then returns against stop 45 where it remains until shaft 32 again reverses, and so on indefinitely.

A spring pressed click or detent 46 maintains the clutch rod 33 in one or the other of its limiting positions.

Work and pattern support 27 comprises a base 47 mounted to slide longitudinally upon rear pedestal 3 and a housing or superstructure 48 bolted to said base. The upper part of the housing provides a supporting surface 49 for the pattern 50, which is held against the same, preferably by screws from the rear as shown, while the lower part is cleared away so as to enable the work 51 to rest upon the base 47, upon which it is held by clamping devices 52 or equivalent means.

A block 53 fixed to the lower side of base 47 is threaded to constitute a nut for a pattern and work feed screw 54 to which, at one end, is fixed a gear 55 which meshes with another gear 56 at the end of work feed shaft 32. Rotation of shaft 32, therefore, moves the work and pattern support 27 to right or left as the case may be.

A cord 57 which passes over suitable pulleys attached to the tracer and cutter frame bracket 13, has a weight 58 at one end and is attached to a bracket 59 fixed to the tracer and cutter frame 17 at its other end, and hence tends to constantly press tracer and cutter against pattern and work respectively. A screw 60 threaded through the same bracket and bearing against a plate fixed to bracket 13 makes it possible to push the tracer and cutter away from pattern and work for purposes of adjustment, exchange of tracer or cutter and the like.

The two halves of split nut 24 are arranged to simultaneously and slidably open away from one another so as to release vertical feed screw 23 through the operation of a cam 61 having eccentric slots into which lugs project from the rear of the nut. This cam is actuated by feed screw release rod 61' having a handle convenient to the operator.

Tracer and cutter frame bracket 13 is provided with a short horizontal rack 62 adapted to be actuated, through a series of gears, by a hand wheel 63 so as to move said bracket to right or left.

Similarly the tracer and cutter frame carriage 5 carries a vertical rack 64 adapted to be actuated, through a series of gears, by hand wheel 65 so as to move said carriage up or down.

The wheel, 63, may be positively locked against rotation by means of a pin 65', carried by one of the wheel spokes and adapted to be engaged in a suitable corresponding hole or locking recess formed in the adjacent end of the bracket by which the wheel is supported. There is thus no possibility of any slip of the tracer and cutter frame upon the tracer and cutter frame bracket when the machine is operating automatically.

Two limit blocks 66, 67, are adjustably attached to the base 47 of the work and pattern support so as to lie on the two sides of a block 68 which is fixed to the clutch rod 33; as the base is moved in either direction, therefore, this block 68 will be engaged by the appropriate limit block and the clutch rod thrown so as to reverse the direction of work feed shaft 32 and feed screw 54 thereby reversing the direction of motion of the work and pattern support 27.

The operation of my improved machine is as follows: The pattern 50 and work 51 being properly positioned with their front faces vertical and parallel to the direction of motion of the work and pattern support 27 and in contact, respectively, with the tracer and cutter, the circuits of the two motors 22 and 26 are closed. This will cause a movement of the work and pattern support 27 to the left, as shown by the arrows in the several figures, and of the work feed shaft 32 counter-clockwise. The tracer and cutter frame carriage 5 will neither raise nor lower. Tracer and cutter frame 17 will, however, pivot upon the arms 15, 16 so as to keep the tracer point 18 against the pattern as the latter moves beneath the point of the tracer. The cutter 19 will simultaneously cut, in the work, a path identical with that followed by the tracer.

When the support 27 has moved sufficiently far to the left, limit block 67 will engage block 68 and throw clutch rod 33 to the left thereby reversing shaft 32 and causing it to rotate clockwise. This will throw arm 40 to the right (clockwise) and back again (Fig. 4) thereby raising carriage 5 and with it the tracer 18 and cutter 19. At the same time the reversal of shaft 32 will reverse feed screw 54 and the support 27 will therefore also reverse and move to the right. There will thus be made upon the work a second cut across its face immediately below and parallel with the first cut and corresponding to a trace across the pattern immediately below the trace corresponding to the earlier movement of support 27 to the left.

When the support 27 has moved sufficiently far to the right, limit block 66 will engage block 68 again reversing the motion of support 27 and simultaneously raising carriage 5 and tracer and cutter by another small amount. This operation will continue until the entire pattern has been gone over by the tracer by reason of the to and fro movements of the pattern under the tracer as just described, each successive trace being opposite to and slightly displaced vertically with respect to the preceding trace, and corresponding to each trace over the pattern the cutter will have cut away the work so that when the operation is concluded, the work will be a replica, in either relief or intaglio, as the case may be, of the pattern.

If it be desired to operate the machine by hand, as in "hogging out," or in cutting detail, the two halves of split nut 24 should be opened away from feed screw 23 controlling the up and down movement of tracer and cutter frame carriage 5. This will enable said carriage to be raised and lowered at will by hand wheel 65 while the tracer and cutter frame itself may be moved to and fro horizontally by hand wheel 63. Tracer and cutter may, hence, both be moved anywhere over an area of pattern and work respectively corresponding, in width and height, to the respective lengths of racks 62 and 64.

By removing gear 56 at the end of shaft 32 the work and pattern support 27 will also be freed from the automatic drive mechanism and may be moved to right or left by means of the handle fixed at the end of feed screw 54. Hence when an area corresponding in width to the length of rack 62 has been worked over, in manual operation of the machine, the work and pattern is simply moved a sufficient distance to right or left, to render a new area accessible, and so on until the entire desired area has been covered or gone over.

Because of the comparative lightness of the parts which require to be moved in order to shift the position of tracer and cutter, in the manual operation of the machine, as just described, the operator is able to run rapidly over the work with very little exertion. For the same reason the tracer and cutter will be under very perfect control and the operator's sense of touch very delicately responsive to all the varying conditions of the surfaces which are being gone over. My invention is, therefore, adapted to the production of work of the highest delicacy and accuracy.

It is sometimes desired that the die, or other reproduced piece of work, be reversed from left to right or from top to bottom, for example, with respect to the pattern. I accomplish this, with the machine just described, by removing the housing 48 from the base 47 and substituting therefor, a special overhanging pattern carrier 69 provided with a grooved shelf to which the pattern 50' may be bolted or otherwise suitably attached. This carrier is bolted, at its rear, to a bed 70 which has longitudinal slidable engagement with the head of a bracket 71 attachable to the back of rear pedestal 3.

Base 47 and bed 70 are respectively provided with longitudinal racks, 72 and 73, and these racks mesh with a rotatable gear 74 mounted upon bracket 71.

In operation, it is obvious that the pattern carrier 69 and the base 47 (carrying the work) can now only move in opposite directions and by the same amount instead of, as formerly, in the same direction. The work will now be reversed longitudinally, or from left to right, as compared with the pattern. Of course, if this reversal is desired along some other dimension than left to right, it is merely necessary to suitably rotate the pattern about an axis normal to its surface before fastening it to its carrier.

Preferably bracket 71 with gear 74, bed 70 with its rack 73, and rack 72 are left permanently attached to pedestal 3. To change from direct to reversed work will then merely require a removal of housing 48 and an addition of pattern carrier 69, or vice versa.

It may be noted that the advantages gained by making the cutter and tracer frame or mounting movable with respect to a relatively fixed work plate and work, as contrasted with the reverse of this arrangement, pertain equally to constructions where said frame is arranged to move in a horizontal, or any other plane, instead of in a vertical plane; and also pertain, of course, to various differing types of machine having the frame movable in a vertical plane.

It is obvious that various other changes of detail may be made by those skilled in the art without departing from the spirit of the invention as hereinbefore described and such changes I intend to include within the scope of the following claims:

1. In an engraving or die sinking machine, a work and pattern support having a vertical surface, means for attaching the work and pattern to said surface, a carrier, and a tracer and a cutter held by the carrier in fixed relation to one another, normal to said vertical surface, the carrier being movable vertically and parallel with said vertical surface and the tracer and cutter being movable in a direction normal to said surface.

2. In an engraving or die sinking machine, a work and pattern support having a vertical surface, means for attaching the work and pattern to said surface, a carrier, and a tracer and a cutter held by the carrier in fixed relation to one another normal to said vertical surface, means for moving the carrier vertically, means for moving the carrier horizontally parallel to said vertical surface and means for moving the tracer and cutter in a direction normal to the work and pattern support.

3. In an engraving and die sinking machine, a work and pattern support having a vertical surface, means for attaching the work and pattern to said surface, a vertically movable tracer and cutter frame carriage, a tracer and cutter frame supported by said carriage and horizontally movable with respect thereto parallel to said vertical surface, and a tracer and a cutter held by said frame in a fixed relation to one another the tracer and cutter being movable in a direction normal to said vertical surface.

4. In an engraving and die sinking machine, a work and pattern support having a vertical surface, means for attaching the work and pattern to said surface, a vertically movable tracer and cutter frame carriage, a tracer and cutter frame pivotally mounted upon a vertical axis supported upon said carriage, a tracer and a cutter held by the frame and normally thereto in fixed relation to one another, means for moving the pivotal axis vertically and independent means for moving said axis horizontally parallel to said vertical surface.

5. In an engraving and die sinking machine, a work and pattern support having a vertical surface, means for attaching the work and pattern to said surface, a vertically movable tracer and cutter frame carriage, a tracer and cutter frame bracket supported by and horizontally movable in said carriage parallel to said vertical support, a tracer and cutter frame pivoted vertically in said bracket, and a tracer and a cutter normal to said frame and held thereby in fixed relation to one another.

6. In an engraving or die sinking machine having a tracer and a cutter held in parallel and spaced but fixed relation to one another, a pattern support and a work support adjacent respectively to said tracer and cutter, racks fixed to each of said supports and a gear pivoted upon a fixed axis between said supports and meshing with each of said racks.

7. In an engraving or die sinking machine, a pedestal, a support longitudinally slidable upon said pedestal, a rack fixed to said support, a bracket fixed to said pedestal, a second support slidably mounted upon said bracket parallel with and above the first support, a rack fixed to the second support, and a gear meshing with both racks and pivotally mounted upon an axis fixed to said pedestal.

8. In an engraving and die sinking machine, a work and pattern support, a tracer and a cutter held in fixed relation to one another, automatic means for moving tracer and cutter in a vertical plane, means for moving tracer and cutter horizontally parallel to the work and pattern suport, automatic means for moving the work and pattern support in its own plane, and means for locking the tracer and cutter against horizontal movement.

9. In an engraving or die sinking machine, a work and pattern support having a vertical surface adapted to receive the work and pattern, a tracer and cutter frame adjacent said support, a tracer and cutter held by said frame in fixed relation to one another and normal to both said frame and said vertical surface, means for moving the work and pattern support horizontally parallel with said vertical surface, means for moving the tracer and cutter frame vertically, and means for moving the tracer and cutter normally with respect to said vertical surface.

In testimony whereof I have hereunto set my hand.

JOSEPH F. KELLER.